United States Patent
Mori

(10) Patent No.: US 11,904,367 B2
(45) Date of Patent: Feb. 20, 2024

(54) CLEANING APPARATUS, IMAGING UNIT INCLUDING CLEANING APPARATUS, AND CLEANING METHOD

(71) Applicant: Murata Manufacturing Co., Ltd., Nagaokakyo (JP)

(72) Inventor: Takaaki Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 41 days.

(21) Appl. No.: 17/399,164

(22) Filed: Aug. 11, 2021

(65) Prior Publication Data
US 2021/0370358 A1    Dec. 2, 2021

Related U.S. Application Data

(63) Continuation of application No. PCT/JP2020/043177, filed on Nov. 19, 2020.

(30) Foreign Application Priority Data

Apr. 30, 2020 (JP) ................................ 2020-080061

(51) Int. Cl.
*B08B 3/12* (2006.01)
*B08B 3/02* (2006.01)
(Continued)

(52) U.S. Cl.
CPC ................. *B08B 3/12* (2013.01); *B08B 3/02* (2013.01); *B08B 13/00* (2013.01); *G02B 27/0006* (2013.01)

(58) Field of Classification Search
CPC .. B08B 3/12; B08B 3/02; B08B 13/00; B08B 7/02; G02B 27/0006; B60S 1/62; G03B 15/00; G03B 17/02; H04N 5/225
See application file for complete search history.

(56) References Cited

U.S. PATENT DOCUMENTS 11,002,954 B2 *  5/2021  Kuratani ............ H04N 5/22521
11,467,396 B2 * 10/2022  Kuratani ................ G03B 17/08
(Continued)

FOREIGN PATENT DOCUMENTS

| CN | 110574358 A | 12/2019 |
| JP | 2012-138768 A | 7/2012 |

(Continued)

OTHER PUBLICATIONS

Official Communication issued in International Patent Application No. PCT/JP2020/043177, dated Jan. 19, 2021.

*Primary Examiner* — Alexander Markoff
(74) *Attorney, Agent, or Firm* — Keating & Bennett, LLP

(57) ABSTRACT

A cleaning apparatus includes an imaging section, a protective cover in a field of view of the imaging section, a vibrator to vibrate the protective cover, a piezoelectric driver to drive the vibrator, a cleaning liquid discharger to discharge a cleaner onto a surface of the protective cover, and a signal processing circuit to control the piezoelectric driver. The signal processing circuit controls the piezoelectric driver such that the protective cover is vibrated at a resonant frequency for a predetermined period after the cleaning liquid is caused to be discharged and controls the piezoelectric driver such that, after the predetermined period, vibration of the protective cover is stopped or the protective cover is vibrated at a frequency other than the resonant frequency.

17 Claims, 7 Drawing Sheets

AT RESONANT FREQUENCY
(PSEUDO-HYDROPHILIC STATE)

NOT AT RESONANT FREQUENCY
(WATER-REPELLENT STATE)

(51) Int. Cl.
*B08B 13/00* (2006.01)
*G02B 27/00* (2006.01)

(56) References Cited

U.S. PATENT DOCUMENTS

| | | | | |
|---|---|---|---|---|
| 2011/0073142 | A1* | 3/2011 | Hattori | B60S 1/52 |
| | | | | 134/198 |
| 2012/0057066 | A1* | 3/2012 | Kawai | H04N 5/22521 |
| | | | | 348/340 |
| 2012/0243093 | A1* | 9/2012 | Tonar | H04N 5/22521 |
| | | | | 359/507 |
| 2014/0299748 | A1* | 10/2014 | Koops | B60S 1/56 |
| | | | | 250/216 |
| 2015/0040953 | A1* | 2/2015 | Kikuta | B60S 1/56 |
| | | | | 134/123 |
| 2016/0266379 | A1* | 9/2016 | Li | B60S 1/56 |
| 2017/0036647 | A1* | 2/2017 | Zhao | G02B 27/0006 |
| 2018/0095272 | A1* | 4/2018 | Fujimoto | B06B 3/02 |
| 2018/0246323 | A1* | 8/2018 | Fedigan | B08B 7/02 |
| 2018/0264526 | A1 | 9/2018 | Kim et al. | |
| 2020/0039475 | A1* | 2/2020 | Ichiguchi | H04N 5/2171 |
| 2020/0057301 | A1* | 2/2020 | Kuratani | G03B 17/08 |
| 2020/0144939 | A1 | 5/2020 | Fujimoto et al. | |
| 2020/0174287 | A1* | 6/2020 | Lam | G02B 1/002 |
| 2021/0063729 | A1* | 3/2021 | Shimizu | H04N 5/225 |
| 2021/0084199 | A1* | 3/2021 | Kishi | H04N 5/22521 |
| 2021/0132372 | A1* | 5/2021 | Kuratani | G02B 27/0006 |
| 2021/0370358 | A1* | 12/2021 | Mori | G02B 27/0006 |

FOREIGN PATENT DOCUMENTS

| | | | | |
|---|---|---|---|---|
| JP | 2015-231173 A | 12/2015 | | |
| JP | 6620914 B2 | 12/2019 | | |
| WO | 2018/169233 A1 | 9/2018 | | |
| WO | 2018/198464 A1 | 11/2018 | | |
| WO | 2018/198465 A1 | 11/2018 | | |
| WO | WO-2018198464 A1 * | 11/2018 | | B08B 3/12 |
| WO | WO-2018198465 A1 * | 11/2018 | | B08B 7/02 |
| WO | WO-2020217600 A1 * | 10/2020 | | B08B 7/02 |
| WO | WO-2020230420 A1 * | 11/2020 | | B08B 17/00 |
| WO | WO-2021220539 A1 * | 11/2021 | | B08B 13/00 |

* cited by examiner

AT RESONANT FREQUENCY
(PSEUDO-HYDROPHILIC STATE)

NOT AT RESONANT FREQUENCY
(WATER-REPELLENT STATE)

CLEANING APPARATUS, IMAGING UNIT INCLUDING CLEANING APPARATUS, AND CLEANING METHOD

CROSS REFERENCE TO RELATED APPLICATIONS

This application claims the benefit of priority to Japanese Patent Application No. 2020-080061 filed on Apr. 30, 2020 and is a Continuation Application of PCT Application No. PCT/JP2020/043177 filed on Nov. 19, 2020. The entire contents of each application are hereby incorporated herein by reference.

BACKGROUND OF THE INVENTION

1. Field of the Invention

The present invention relates to a cleaning apparatus, an imaging unit including the cleaning apparatus, and a cleaning method.

2. Description of the Related Art

An imaging unit has been provided at a front portion or a rear portion of a vehicle to record an image captured by the imaging unit or to control a safety device using the captured image. Since such an imaging unit is often provided outside the vehicle, foreign matter such as raindrops, mud, and dust may adhere to a light-transmissive body (lens or protective glass) that covers an outside of an imaging element. When foreign matter adheres to the light-transmissive body, the foreign matter that has adhered is reflected in an image captured by the imaging unit and a clear image cannot be obtained.

Thus, an imaging unit provided with a function of removing raindrops adhering to a light-transmissive body covering an outside of an imaging element has been developed (Japanese Unexamined Patent Application Publication No. 2012-138768). In the imaging unit disclosed in Japanese Unexamined Patent Application Publication No. 2012-138768, a dome-shaped cover is disposed in front of the imaging element, and a piezoelectric ceramic vibrator is disposed on a cylindrical portion at an extended position of the dome-shaped cover. Thus, in the imaging unit, when raindrops adhere to the dome-shaped cover, the piezoelectric ceramic vibrator can be vibrated to remove the raindrops adhering to the dome-shaped cover.

In the imaging unit described in Japanese Unexamined Patent Application Publication No. 2012-138768, when raindrops adhering to the dome-shaped cover are to be removed by vibration, after excitation is started, the piezoelectric ceramic vibrator is rapidly vibrated at up to a highest frequency. Thereafter, in the piezoelectric ceramic vibrator, the frequency is repeatedly swept along a sawtooth wave in which a maximum point gradually decreases in a vicinity of a frequency of good efficiency and is set to 0 (zero) at an end of the excitation. Alternatively, in the piezoelectric ceramic vibrator, the frequency is swept in a monotonically decreasing manner from a vicinity of a resonant frequency in the configuration including the cylindrical portion and the dome-shaped cover and is set to 0 (zero) at an end of the excitation.

That is, in the imaging unit described in Japanese Unexamined Patent Application Publication No. 2012-138768, when raindrops adhering to the dome-shaped cover are to be removed by vibration, the frequency is swept only in the above-described pattern, and vibration is always performed in the same vibration pattern regardless of a type of foreign matter. Furthermore, in the imaging unit, since there is no method of removing foreign matter adhering to the dome-shaped cover other than vibrating the dome-shaped cover, there has been a possibility that foreign matter adhering to the dome-shaped cover (light-transmissive body) cannot be removed depending on a type of foreign matter.

SUMMARY OF THE INVENTION

Preferred embodiments of the present invention provide cleaning apparatuses that are each able to effectively clean foreign matter adhering to a light-transmissive body, imaging units each including such cleaning apparatuses, and cleaning methods.

A cleaning apparatus according to a preferred embodiment of the present disclosure includes a holder to hold an imaging element, a light-transmissive body in a field of view of the imaging element, a vibrator to vibrate the light-transmissive body, a driver to drive the vibrator, a discharger to discharge a cleaner onto a surface of the light-transmissive body, and a controller to control the driver and the discharger, in which the controller is configured or programmed to control the driver such that the light-transmissive body is vibrated at a resonant frequency for a predetermined period after the discharger is caused to discharge the cleaner and control the driver such that, after the predetermined period, vibration of the light-transmissive body is stopped or the light-transmissive body is vibrated at a frequency other than the resonant frequency.

An imaging unit according to a preferred embodiment of the present disclosure includes the cleaning apparatus described above.

A cleaning method according to a preferred embodiment of the present disclosure is a cleaning method for cleaning a surface of a light-transmissive body by a cleaning apparatus that includes a holder to hold an imaging element, the light-transmissive body in a field of view of the imaging element, a vibrator to vibrate the light-transmissive body, a driver to drive the vibrator, a discharger to discharge a cleaner onto the surface of the light-transmissive body, and a controller to control the driver and the discharger, the cleaning method including causing the discharger to discharge the cleaner, controlling the driver such that the light-transmissive body is vibrated at a resonant frequency for a predetermined period after the cleaner is caused to be discharged, and controlling the driver such that, after the predetermined period, vibration of the light-transmissive body is stopped or the light-transmissive body is vibrated at a frequency other than the resonant frequency.

According to preferred embodiments of the present invention, since the controller controls the driver such that the light-transmissive body is vibrated at the resonant frequency for the predetermined period after causing the cleaner to be discharged and then controls the driver such that vibration of the light-transmissive body is stopped or the light-transmissive body is vibrated at a frequency other than the resonant frequency, it is possible to effectively clean foreign matter adhering to the light-transmissive body.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
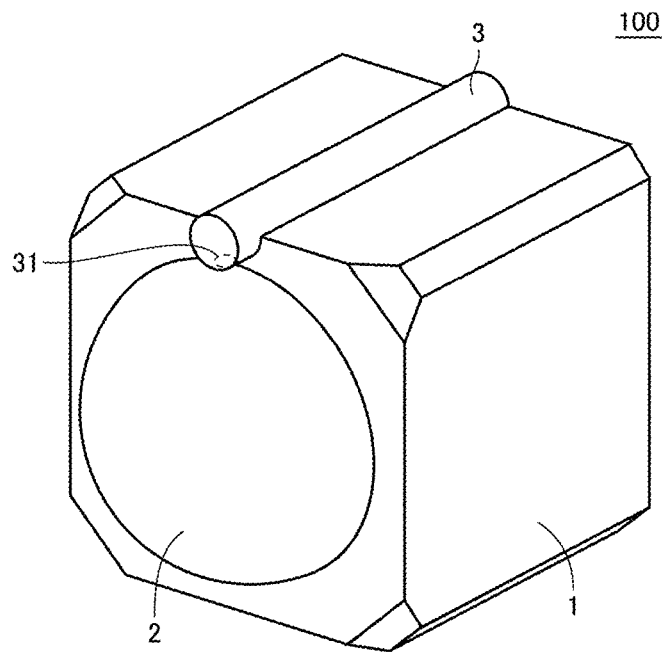
FIG. 1 is a perspective view of an imaging unit according to Preferred Embodiment 1 of the present invention.

Hereinafter, imaging units according to preferred embodiments of the present invention will be described in detail with reference to the drawings. Note that, in the drawings, the same reference numeral denotes the same or corresponding elements and portions.

Preferred Embodiment 1

Figure 2:
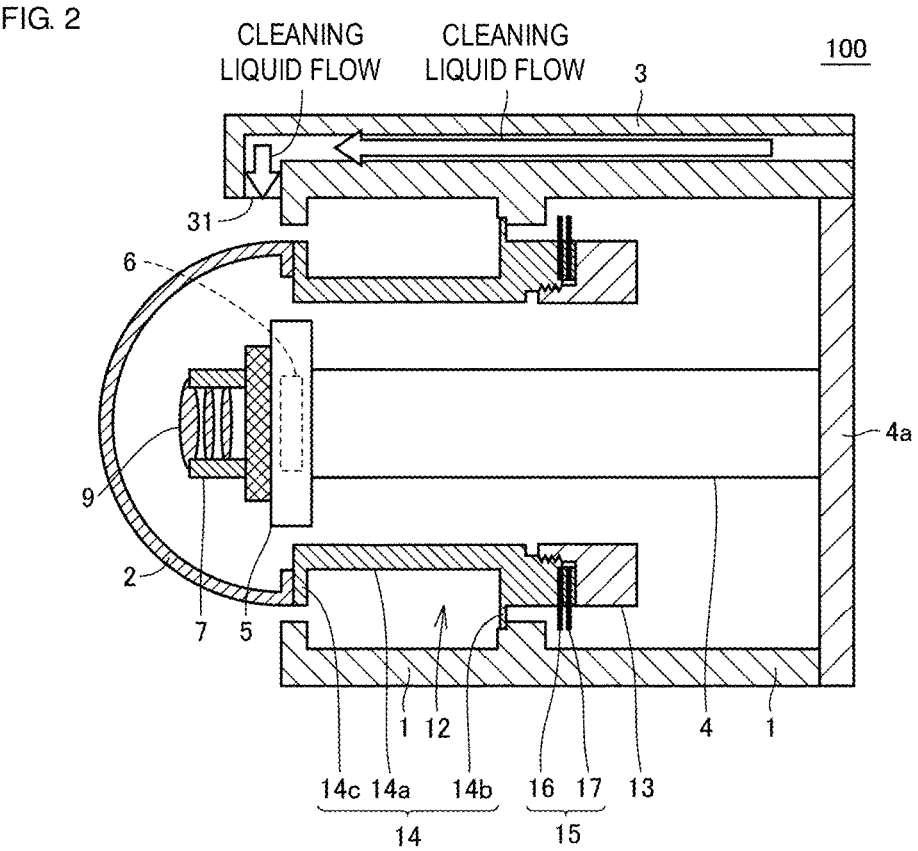
FIG. 2 is a sectional view of the imaging unit according to Preferred Embodiment 1 of the present invention.

Hereinafter, an imaging unit according to Preferred Embodiment 1 will be described with reference to the drawings. FIG. 1 is a perspective view of an imaging unit 100 according to Preferred Embodiment 1. FIG. 2 is a sectional view of the imaging unit 100 according to Preferred Embodiment 1. The imaging unit 100 includes a housing 1, a protective cover 2, which is transparent and provided on one surface of the housing 1, a cleaning nozzle 3 including an opening 31 for discharging a cleaning liquid onto a protective cover 2, a vibrator 12 for vibrating the protective cover 2, and an imaging section 5 provided inside the protective cover 2. Note that, a configuration including the housing 1, the protective cover 2, the cleaning nozzle 3, and the vibrator 12 and excluding the imaging section 5 from the imaging unit 100 defines a cleaning apparatus for cleaning foreign matter (adhering matter) adhering to an imaging range of the imaging section 5.

As illustrated in FIG. 2, the imaging section 5 is supported by a main body member 4 with a cylindrical or substantially cylindrical shape and fixed to a base plate 4a. The base plate 4a is fixed to a portion of the housing 1. Thus, the housing 1 defines and functions as a holder that holds the imaging section 5 via the main body member 4 and the base plate 4a. Note that, the holder is not limited to the structure illustrated in FIG. 2 as long as the imaging section 5 can be held.

A circuit 6 including an imaging element is built in the imaging section 5. A lens module 7 is fixed in an imaging direction of the imaging section 5. Note that, the imaging element is, for example, a charge coupled device (CCD) image sensor, a complementary MOS (CMOS) image sensor, or the like. The lens module 7 includes a cylindrical body, and a plurality of lenses 9 are provided therein. Note that, the structure of the imaging section 5 is not particularly limited as long as an object to be imaged positioned in front of the lens 9 can be imaged.

The housing 1 has a rectangular or substantially rectangular tube shape and is made of, for example, metal or a synthetic resin. Note that, the housing 1 may have another shape, such as a cylindrical or substantially cylindrical shape, for example. The base plate 4a is fixed to one end side of the housing 1, and the protective cover 2 and the vibrator 12 are provided on the other end side of the housing 1.

The vibrator 12 has a cylindrical or substantially cylindrical shape. The vibrator 12 includes a first cylindrical member 13 having a cylindrical or substantially cylindrical shape, a second cylindrical member 14 having a cylindrical or substantially cylindrical shape, and a piezoelectric vibrator 15 having a cylindrical or substantially cylindrical shape. The cylindrical piezoelectric vibrator 15 includes two cylindrical or substantially cylindrical piezoelectric plates 16 and 17. In the two piezoelectric plates 16 and 17, a polarization direction of one piezoelectric plate is opposite to a polarization direction of the other piezoelectric plate in a thickness direction.

Note that, in the present preferred embodiment, the vibrator and the piezoelectric vibrator may each have, for example, a rectangular or substantially rectangular tube shape, instead of the cylindrical or substantially cylindrical shape. Preferably, a cylindrical or ring shape is used.

The piezoelectric plates 16 and 17 are each made of, for example, PZT based piezoelectric ceramics. However, other piezoelectric ceramics such as, for example, (K, Na)NbO$_3$ may be used. Further, a piezoelectric single crystal such as, for example, LiTaO$_3$ may be used. Electrodes (not illustrated) are provided on both surfaces of the piezoelectric plates 16 and 17. This electrode has a laminated structure of, for example, Ag/NiCu/NiCr.

The first cylindrical member 13 having a cylindrical or substantially cylindrical shape is fixed to a lower surface of the piezoelectric vibrator 15. The first cylindrical member 13 is made of metal, for example. As the metal, for example, duralumin, stainless, kovar, or the like can be used. However, the first cylindrical member 13 may be made of a semiconductor such as, for example, Si having conductivity.

The piezoelectric vibrator 15 is sandwiched between a portion of the first cylindrical member 13 and a portion of the second cylindrical member 14. The first cylindrical member 13 and the second cylindrical member 14 are each made of, for example, metal and have conductivity. By applying an AC electric field to an electrode of each of the piezoelectric plates 16 and 17, the piezoelectric vibrator 15 can be longitudinally or laterally vibrated. A female screw portion is provided on an inner peripheral surface of a part of the second cylindrical member 14. Thereby, the first cylindrical member 13 is screwed into the second cylindrical member 14, and the first cylindrical member 13 is fixed to the second cylindrical member 14. By this screwing operation, a portion of the first cylindrical member 13 and a portion of the second cylindrical member 14 are pressed to contact an upper surface and a lower surface of the piezoelectric vibrator 15.

Accordingly, vibration generated in the piezoelectric vibrator 15 efficiently vibrates the vibrator 12. In the present preferred embodiment, the vibrator 12 is efficiently excited by a longitudinal effect or a lateral effect.

On the other hand, the second cylindrical member 14 includes a flange portion 14b projecting outward. The flange portion 14b is located on and fixed to a recessed portion of the housing 1.

A flange portion 14c projecting outward is provided at an end of the second cylindrical member 14. A portion extending between the flange portion 14b and the flange portion 14c is a thin-walled portion 14a. A thickness of the thin-walled portion 14a is less than a thickness of the first cylindrical member 13. Thus, the thin-walled portion 14a, which is cylindrical or substantially cylindrical shape, is largely displaced by vibration of the vibrator 12. Due to the presence of the thin-walled portion 14a, vibration, particularly amplitude, can be increased.

The protective cover 2 is fixed to the flange portion 14c. The protective cover 2 defines and functions as a light-transmissive body that transmits light from an object to be imaged. The protective cover 2 includes an opening opened in one direction. An end of the opening is joined to the flange portion 14c. This joining is made using, for example, an adhesive or a brazing material. Further, for example, thermal compression bonding, anodic bonding, or the like may be used.

The protective cover 2 has a dome shape extending from the end joined to the flange portion 14c. In the present preferred embodiment, for example, the dome shape is a hemispherical shape. Note that, the imaging section 5 has a viewing angle of, for example, about 170°. However, the dome shape is not limited to the hemispherical shape. A shape in which a cylinder extends from a hemisphere, or a curved surface smaller than a hemisphere may be used, for example. In addition, a flat plate shape, instead of the dome shape, may also be used, for example. An entirety or substantially an entirety of the protective cover 2 has translucency. In the present preferred embodiment, the protective cover 2 is made of glass, for example. However, instead of glass, for example, transparent plastic, or the like may be used. Alternatively, for example, translucent ceramics may be used. Depending on the application, it is preferable to use tempered glass. Thus, the strength can be improved. Further, in the case of glass, a coating layer made of DLC or the like, for example, may be provided on a surface in order to improve the strength.

The lens module 7 and the imaging section 5 described above are disposed inside the protective cover 2. An external object to be imaged is photographed through the protective cover 2.

The housing 1 is provided with the cleaning nozzle 3 including the opening 31 for discharging a cleaning liquid onto the protective cover 2. The cleaning nozzle 3 has a cylindrical or substantially cylindrical shape, is supplied with the cleaning liquid from an end portion opposite to an end portion in which the opening 31 is provided, and discharges the cleaning liquid from the opening 31 to an end of the protective cover 2. A tip of the cleaning nozzle 3 is outside an imaging range (field of view) of the imaging section 5, and the opening 31 is not at a position that is reflected in an image of the imaging section 5. In FIG. 2, a flow of the cleaning liquid is indicated by arrows. The cleaning nozzle 3 functions as a discharger that discharges the cleaning liquid. In the present preferred embodiment, the configuration is illustrated in which one cleaning nozzle 3 is provided in the housing 1, but a configuration may be adopted in which a plurality of cleaning nozzles 3 are provided in the housing 1.

Figure 3:
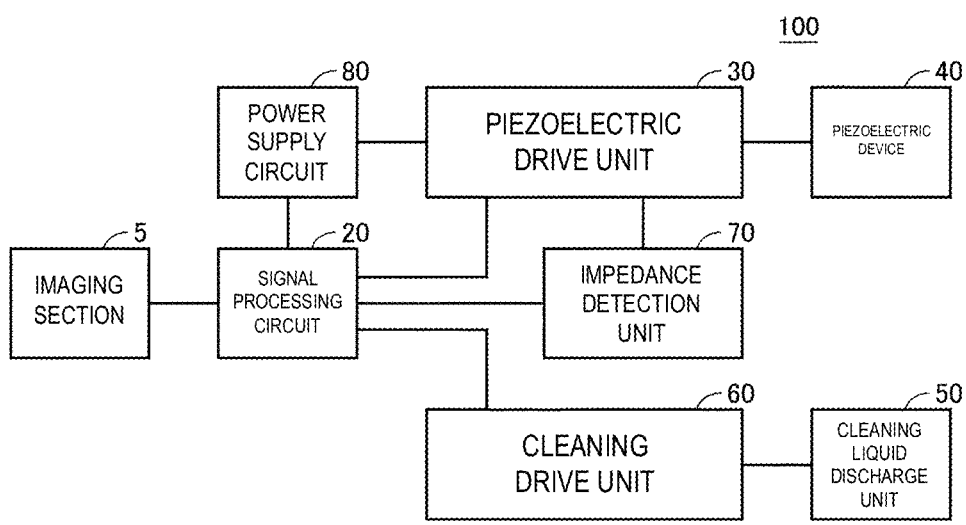
FIG. 3 is a block diagram for explaining control of a cleaning apparatus of the imaging unit according to Preferred Embodiment 1 of the present invention.

Next, control of the cleaning apparatus will be described with reference to FIG. 3. FIG. 3 is a block diagram for explaining control of the cleaning apparatus of the imaging unit 100 according to Preferred Embodiment 1.

The imaging unit 100 includes the imaging section 5, a signal processing circuit 20, a piezoelectric driver 30, a piezoelectric device 40, a cleaning liquid discharger 50, a cleaning driver 60, an impedance detection unit 70, and a power supply circuit 80. The signal processing circuit 20 is a controller that processes an imaging signal from the imaging section 5 and supplies a control signal to the piezoelectric driver 30 and the cleaning driver 60. As the cleaning liquid discharger 50, a configuration in which a cleaning liquid is discharged from the opening 31 of the cleaning nozzle 3 is illustrated as one block.

The signal processing circuit 20 includes, for example, a central processing unit (CPU) as a control center, a read only memory (ROM) storing a program, control data, and the like for operating the CPU, a random access memory (RAM) defining and functioning as a work area of the CPU, an input/output interface for maintaining signal consistency with peripheral devices, and the like.

The piezoelectric driver 30 generates an AC output signal having a frequency f and a voltage V, according to a control signal from the signal processing circuit 20 and a drive voltage. The piezoelectric device 40 is defined by the vibrator 12 including the piezoelectric vibrator 15 illustrated in FIG. 2, and when an AC output signal is applied to the piezoelectric vibrator 15, the vibrator 12 and the protective cover 2 vibrates to remove foreign matter.

Further, the signal processing circuit 20 can generate a control signal for discharging a cleaning liquid to the protective cover 2 to perform cleaning. The cleaning driver 60 controls, based on a control signal from the signal processing circuit 20, the cleaning liquid discharger 50 to discharge a cleaning liquid onto the protective cover 2.

The impedance detector 70 monitors a current of the piezoelectric driver 30, when an AC output signal is applied to the piezoelectric vibrator 15 to operate the piezoelectric device 40. Thus, the signal processing circuit 20 can perform, based on impedance detected by the impedance detector 70, tracking control (feedback control) such that the protective cover 2 is always vibrated at a resonant frequency. Note that, in order to vibrate the protective cover 2 at the resonant frequency, it is necessary to cause the piezoelectric vibrator 15 to vibrate the vibrator 12 and the protective cover 2 at the resonant frequency.

Figure 4:
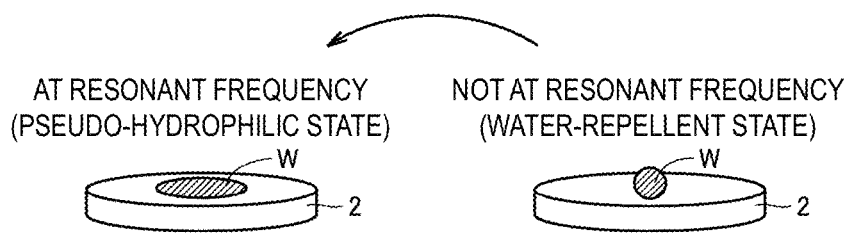
FIG. 4 is a diagram for explaining a state of a cleaning liquid discharged onto a surface of a protective cover.

Next, how a cleaning liquid discharged onto a surface of the protective cover 2 changes when the protective cover 2 is vibrated at the resonant frequency will be described with reference to FIG. 4. FIG. 4 is a diagram for explaining a state of a cleaning liquid discharged onto the surface of the protective cover 2. The protective cover 2 includes water-repellent coating or the like on the surface thereof in some cases and has water repellency. Thus, when about 2 ml of a cleaning liquid W is discharged onto the surface of the protective cover 2, the water repellency of the protective cover 2 causes a contact angle between the cleaning liquid W and the protective cover 2 to be about 90 degrees or greater, and a contact area between the cleaning liquid W and the protective cover 2 to be about 0.02 $cm^2$, for example.

On the other hand, when the protective cover 2, onto the surface of which the cleaning liquid W is discharged, is vibrated at the resonant frequency, the cleaning liquid W and the protective cover 2 resonate with each other to reduce surface tension of the cleaning liquid W, and the cleaning liquid W easily spreads out. That is, when vibration energy of the protective cover 2 is applied to the cleaning liquid W, the cleaning liquid W easily spreads out on the surface of the protective cover 2, and a state changes as though the surface of the protective cover 2 is hydrophilic (pseudo-hydrophilic). Specifically, when about 2 ml of the cleaning liquid W is discharged onto the surface of the protective cover 2 and the protective cover 2 is vibrated at the resonant frequency, the contact angle between the cleaning liquid W and the protective cover 2 becomes about 6 degrees due to the pseudo-hydrophilicity of the protective cover 2, and the cleaning liquid W spreads out to have the contact area of about 0.28 cm$^2$, for example, between the cleaning liquid W and the protective cover 2. That is, vibrating the protective cover 2 at the resonant frequency makes it possible to spread out the cleaning liquid W until the contact area increases about 14 times.

Figure 5:
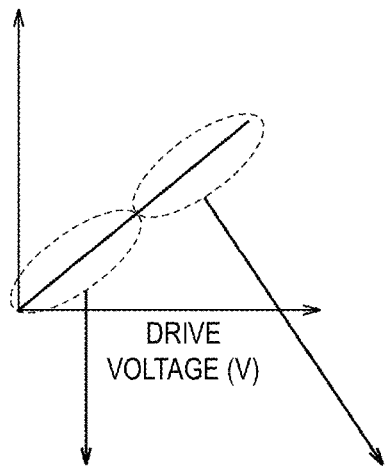
FIG. 5 is a diagram for explaining a relationship between a contact angle, which is formed between the cleaning liquid and the protective cover, and a drive voltage of a piezoelectric device.
Figure 5:
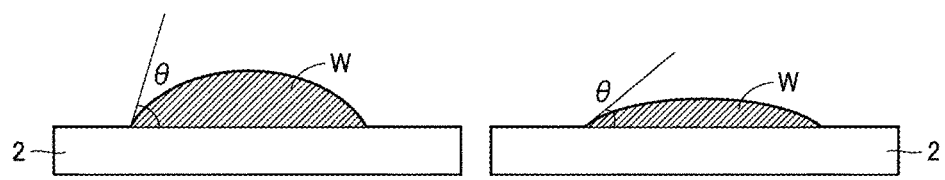

Further, a relationship between the contact angle, which is formed between the cleaning liquid W and the protective cover 2, and a drive voltage of the piezoelectric device 40 will be described with reference to FIG. 5. FIG. 5 is a diagram for explaining the relationship between the contact angle, which is formed between the cleaning liquid W and the protective cover 2, and the drive voltage of the piezoelectric device 40. As illustrated in FIG. 5, when the protective cover 2, onto the surface of which the cleaning liquid W is discharged, is vibrated at the resonant frequency, a magnitude of vibration (magnitude of amplitude) can be increased by increasing the drive voltage of the piezoelectric device 40. Thus, since the vibration energy of the protective cover 2 applied to the cleaning liquid W also increases, the cleaning liquid W more easily spreads out on the surface of the protective cover 2.

Specifically, when the drive voltage of the piezoelectric device 40 is low, the contact angle between the cleaning liquid W and the protective cover 2 is about 50 degrees, for example. On the other hand, when the drive voltage of the piezoelectric device 40 is high, the contact angle between the cleaning liquid W and the protective cover 2 is about 6 degrees, for example.

Figure 6:
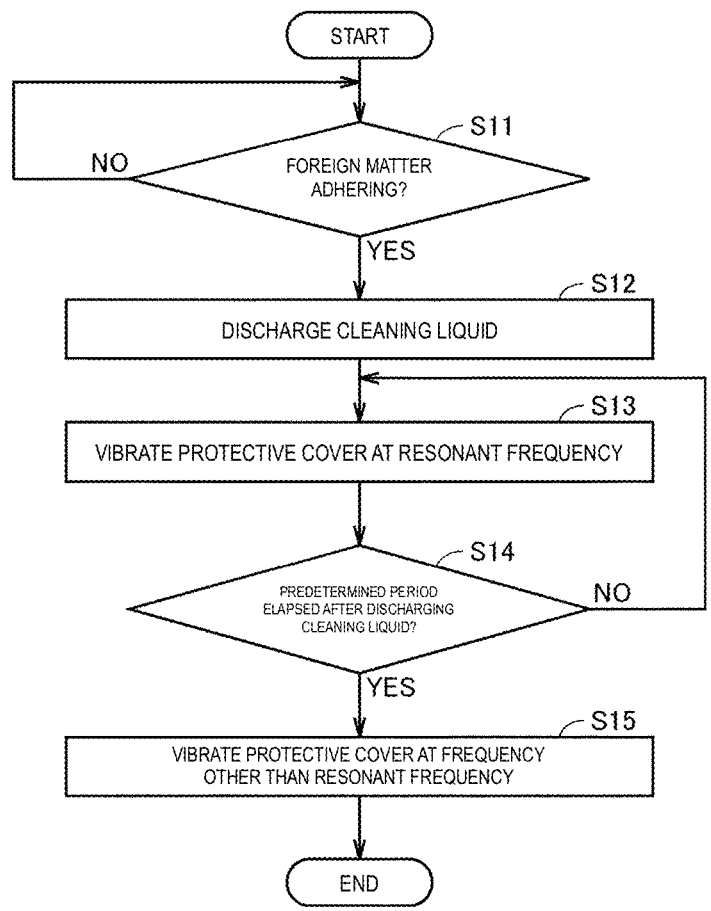
FIG. 6 is a flowchart for explaining operation of the cleaning apparatus of the imaging unit according to Preferred Embodiment 1 of the present invention.

Next, operation of the cleaning apparatus of the imaging unit will be described based on a flowchart. FIG. 6 is a flowchart for explaining operation of the cleaning apparatus of the imaging unit according to Preferred Embodiment 1. First, the signal processing circuit 20 determines that foreign matter adheres to the surface of the protective cover 2 (step S11). The signal processing circuit 20 can determine whether or not foreign matter adheres to the surface of the protective cover 2, based on a change over time in a value (for example, a current value) related to impedance and detected by the impedance detector 70 when the piezoelectric device 40 is operated or a change over time in an image captured by the imaging element.

Note that, the signal processing circuit 20 may also determine whether or not foreign matter adheres to the surface of the protective cover 2 by combining the change over time in the value related to the impedance and detected by the impedance detector 70 and the change over time in the image captured by the imaging element. In addition, the signal processing circuit 20 operates as a determination unit that determines foreign matter adhering to the surface of the protective cover 2.

Further, the signal processing circuit 20 may specify a type of the foreign matter adhering to the surface of the protective cover 2, based on an analysis result (brightness integrated value) of the image captured by the imaging element. Accordingly, the signal processing circuit 20 can determine that the foreign matter adhering to the surface of the protective cover 2 is opaque matter such as, for example, mud.

When no foreign matter adheres to the surface of the protective cover 2 (NO in step S11), the processing returns to step S11 and the signal processing circuit 20 monitors adhering of foreign matter to the surface of the protective cover 2. On the other hand, when the foreign matter adheres to the surface of the protective cover 2 (YES in step S11), the signal processing circuit 20 drives the cleaning driver 60 to cause a cleaning liquid to be discharged (step S12).

In order to make the surface of the protective cover 2 pseudo-hydrophilic, the signal processing circuit 20 causes the protective cover 2 to vibrate at the resonant frequency when the cleaning liquid W is discharged onto the surface (step S13). By making the surface of the protective cover 2 pseudo-hydrophilic, the discharged cleaning liquid W easily spreads out on the surface of the protective cover 2. Thus, even when an amount of the cleaning liquid W to be discharged onto the surface of the protective cover 2 is small, it is possible to remove the foreign matter adhering to the surface of the protective cover 2.

Figure 7:
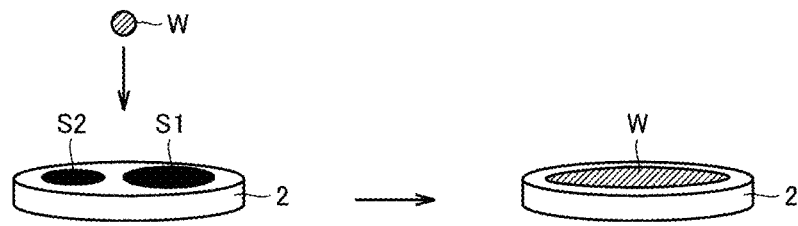
FIG. 7 is a diagram for explaining a state in which foreign matter adhering to a surface of a protective cover 2 is removed with a small amount of the cleaning liquid.

A state in which a small amount of the cleaning liquid W is discharged to remove foreign matter adhering to the surface of the protective cover 2 will be described with reference to FIG. 7. FIG. 7 is a diagram for explaining a state in which foreign matter adhering to the surface of the protective cover 2 is removed with a small amount of the cleaning liquid W. First, in FIG. 7, foreign matters S1 and S2 different in size adhere to the surface of the protective cover 2. A small amount (for example, about 0.5 ml) of the cleaning liquid W is discharged onto the surface of the protective cover 2. When the protective cover 2 is vibrated not at the resonant frequency, only a portion of the foreign matters S1 and the S2 can be wetted with the small amount of the cleaning liquid W due to water repellency of the protective cover 2.

However, when the protective cover 2 is vibrated at the resonant frequency, the surface of the protective cover 2 becomes pseudo-hydrophilic, and even the small amount of the cleaning liquid W can wet the foreign matters S1 and S2 entirely. FIG. 7 illustrates a state in which the cleaning liquid W spreading out on the surface of the protective cover 2 covers the foreign matters S1 and S2 entirely.

Figure 8:
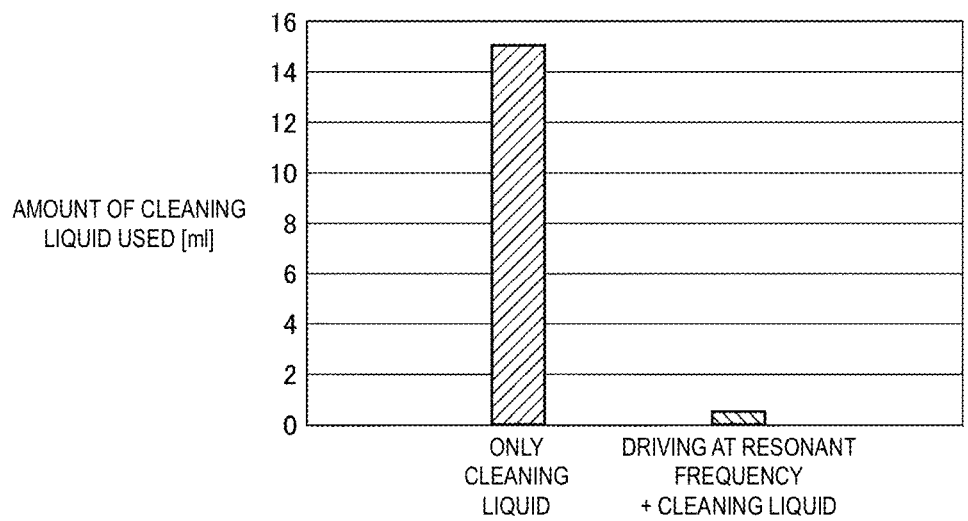
FIG. 8 is a graph showing an amount of a cleaning liquid W necessary to remove foreign matter in each of a case where the protective cover is vibrated not at a resonant frequency, and a case where the protective cover is vibrated at the resonant frequency.

FIG. 8 is a graph showing an amount of the cleaning liquid W necessary for removing foreign matter in each of a case where the protective cover 2 is vibrated not at the resonant frequency and a case where the protective cover 2 is vibrated at the resonant frequency. In FIG. 8, when the protective cover 2 is vibrated not at the resonant frequency to discharge the cleaning liquid W, the amount of the cleaning liquid W necessary for removing the foreign matter is about 15.1 ml, for example. On the other hand, when the protective cover 2 is vibrated at the resonant frequency to discharge the cleaning liquid W, the amount of the cleaning liquid W necessary for removing the foreign matter is about 0.6 ml, for example.

That is, about 14.5 ml of the cleaning liquid W can be reduced by the protective cover 2 being vibrated at the resonant frequency. In particular, in an imaging unit provided in a vehicle, a tank storing the cleaning liquid W may not be increased in size in some cases, and when an amount of the cleaning liquid W to be used can be reduced with the same cleaning power, the imaging unit can be reduced in size.

Referring back to FIG. 6, the signal processing circuit 20 determines whether a predetermined period (for example, two to three seconds) elapses after the protective cover 2 is vibrated at the resonant frequency and the cleaning liquid W is discharged onto the surface (step S14). Note that, the signal processing circuit 20 may perform control such that, when a type of the foreign matter adhering to the surface of the protective cover 2 is specified based on an analysis result of an image captured by the imaging element, the signal processing circuit 20 changes the predetermined period and causes the protective cover 2 to be vibrated at the resonant frequency for a period according to the type of foreign matter.

When the predetermined period does not elapse after the cleaning liquid W is discharged onto the surface (NO in step S14), the processing returns to step S13 and the signal processing circuit 20 continues the process of causing the protective cover 2 to be vibrated at the resonant frequency. On the other hand, when the predetermined period elapses after the cleaning liquid W is discharged onto the surface (YES in step S14), the signal processing circuit 20 causes the protective cover 2 to be vibrated at a frequency other than the resonant frequency (step S15).

By vibrating the protective cover 2 at a frequency other than the resonant frequency, the state of the surface of the protective cover 2 being pseudo-hydrophilic can be returned to the state of water repellency. That is, the imaging unit 100 can vibrate the protective cover 2 at a frequency other than the resonant frequency to flick off the foreign matter adhering to the surface of the protective cover 2 together with the cleaning liquid W. Thus, the imaging unit 100 can more strongly clean off the foreign matter adhering to the protective cover 2. Note that, the signal processing circuit 20 may stop vibration of the protective cover 2, instead of causing the protective cover 2 to be vibrated at a frequency other than the resonant frequency. Since the surface of the protective cover 2 is water-repellent, the foreign matter adhering to the surface of the protective cover 2 can be flicked off together with the cleaning liquid W, also when the vibration of the protective cover 2 is stopped.

As described above, in order to make it easy for the cleaning liquid W to spread out on the surface of the protective cover 2, it is preferable that the signal processing circuit 20 continues to cause the protective cover 2 to be vibrated at the resonant frequency for the predetermined period after the cleaning liquid W is discharged onto the surface. However, since the state of the protective cover 2 changes, for example, the foreign matter adhering to the surface of the protective cover 2 is removed during the predetermined period, the resonant frequency may change. Thus, there was a case in which, even when the signal processing circuit 20 causes the protective cover 2 to be vibrated at the resonant frequency at the beginning of the predetermined period, the protective cover 2 is vibrated at a frequency other than the resonant frequency of the protective cover 2 later.

Figure 9:
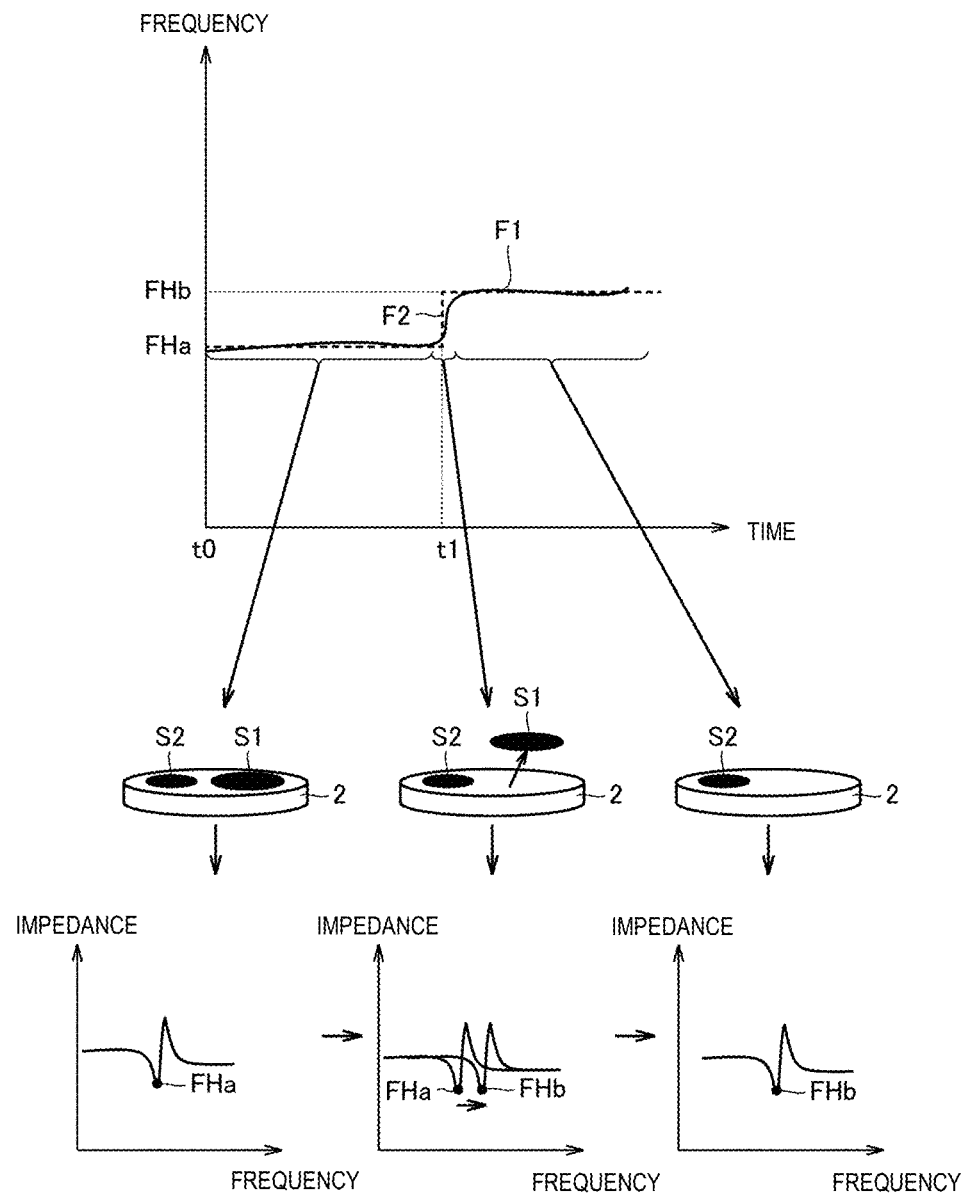
FIG. 9 is a graph for explaining tracking control for vibrating the protective cover at the resonant frequency.

Thus, the imaging unit 100 performs, based on the impedance detected by the impedance detector 70, tracking control such that the protective cover 2 is always vibrated at the resonant frequency. FIG. 9 is a graph for explaining the tracking control for vibrating the protective cover 2 at the resonant frequency.

First, the foreign matters S1 and S2 different in size adhere to the surface of the protective cover 2. In this case, the signal processing circuit 20 causes the protective cover 2 to be vibrated at a resonant frequency FHa at which impedance shown in the graph of frequency and impedance in FIG. 9 rapidly changes.

Next, the foreign matter S1 is removed from the surface of the protective cover 2 at timing when a time t1 elapses after the protective cover 2 is vibrated at the resonant frequency FHa. When the foreign matter S1 is removed from the surface of the protective cover 2 and the state of the protective cover 2 changes, the resonant frequency of the protective cover 2 changes to be higher from the resonant frequency FHa to a resonant frequency FHb.

When the change in the resonant frequency of the protective cover 2 from the resonant frequency FHa to the resonant frequency FHb is detected based on the impedance detected by the impedance detector 70, the signal processing circuit 20 performs the tracking control for vibrating the protective cover 2 at the resonant frequency FHb higher than the resonant frequency FHa.

As shown in a graph of frequency and time in FIG. 9, when the change in the resonant frequency of the protective cover 2 with respect to time is a change as a waveform F2, the signal processing circuit 20 causes the piezoelectric driver 30 to vibrate the piezoelectric device 40 in accordance with the change. It can be seen that the change in the frequency with respect to time when the piezoelectric driver 30 causes the piezoelectric device 40 to vibrate is like a waveform F1 and that the piezoelectric device 40 vibrates so as to track the change in the frequency along the waveform F2.

As described above, the imaging unit 100 according to Preferred Embodiment 1 includes the cleaning apparatus. This cleaning apparatus is configured to include the housing 1 for holding the imaging section 5, the protective cover 2 disposed in the field of view of the imaging section 5, the vibrator 12 to vibrate the protective cover 2, the piezoelectric driver 30 to drive the vibrator 12, the cleaning liquid discharger 50 to discharge a cleaner onto the surface of the protective cover 2, and the signal processing circuit 20 to control the piezoelectric driver 30. The signal processing circuit 20 controls the piezoelectric driver 30 such that the protective cover 2 is vibrated at the resonant frequency for the predetermined period after the cleaning liquid discharger 50 is caused to discharge the cleaning liquid W and controls the piezoelectric driver 30 such that, after the predetermined period, vibration of the protective cover 2 is stopped or the protective cover 2 is vibrated at a frequency other than the resonant frequency.

Thus, in the cleaning apparatus according to Preferred Embodiment 1, the signal processing circuit 20 controls the piezoelectric driver 30 such that the protective cover 2 is vibrated at the resonant frequency for the predetermined period after the cleaning liquid is caused to be discharged and then controls the piezoelectric driver 30 such that vibration of the protective cover 2 is stopped or the protective cover 2 is vibrated at a frequency other than the resonant frequency, and thus the foreign matter adhering to the protective cover 2 can be effectively cleaned.

Note that, a cleaning method of cleaning the surface of protective cover 2 by the cleaning apparatus of the imaging unit 100 according to Preferred Embodiment 1 includes a step of causing the cleaning liquid discharger 50 to discharge a cleaning liquid, a step of controlling the piezoelectric driver 30 such that the protective cover 2 is vibrated at a resonant frequency for a predetermined period after the cleaning liquid is caused to be discharged, and a step of controlling the piezoelectric driver 30 such that, after the predetermined period, vibration of the protective cover 2 is stopped or the protective cover 2 is vibrated at a frequency other than the resonant frequency.

Further, the signal processing circuit 20 may be capable of changing a drive voltage of the piezoelectric driver 30 in the predetermined period. This makes it possible to change the drive voltage of the piezoelectric driver 30 and to adjust a contact angle of the cleaning liquid discharged onto the surface of the protective cover 2, thus making it possible to reduce an amount of the cleaning liquid to be discharged.

Furthermore, the impedance detector 70 to detect a value related to the impedance of the piezoelectric device 40 driven by the piezoelectric driver 30 may be further included, and the signal processing circuit 20 may perform, based on the impedance detected by the impedance detector 70, tracking control such that the protective cover 2 is always vibrated at the resonant frequency. Thus, even when a state of the surface of the protective cover 2 changes during the predetermined period, the protective cover 2 can always be vibrated at the resonant frequency, and the cleaning liquid discharged onto the surface of the protective cover 2 can be easily spread out.

In addition, the signal processing circuit 20 may operate as a determiner to determine foreign matter adhering to the surface of the protective cover 2. When determining that foreign matter adheres to the surface of the protective cover 2, the signal processing circuit 20 may cause the cleaning liquid discharger 50 to discharge the cleaning liquid. Thus, when the foreign matter adheres to the surface of the protective cover 2, the cleaning liquid can be discharged from the cleaning liquid discharger 50.

Further, the signal processing circuit 20 may determine, based on at least one piece of information of a change over time in a value related to the impedance and detected by the impedance detector 70 and a change over time in an image captured by the imaging element, that foreign matter adheres to the surface of the protective cover 2. Thus, the signal processing circuit 20 can discriminate the foreign matter adhering to the surface of the protective cover 2 without a sensor to be separately provided for detecting the foreign matter adhering to the surface of the protective cover 2.

Further, when a type of the foreign matter adhering to the surface of the protective cover 2 is specified based on an analysis result of the image captured by the imaging element, the signal processing circuit 20 may change the predetermined period, for which the protective cover 2 is vibrated at the resonant frequency, according to the type of foreign matter. Accordingly, the signal processing circuit 20 can vibrate the protective cover 2 at the resonant frequency for an optimum period according to the type of the foreign matter adhering to the surface of the protective cover 2.

Preferred Embodiment 2

In the cleaning apparatus according to Preferred Embodiment 1, the resonant frequency of the protective cover 2 may change due to temperature. Thus, in a cleaning apparatus according to Preferred Embodiment 2 of the present invention, a configuration in which a temperature detector that measures temperature is provided will be described.

Figure 10:
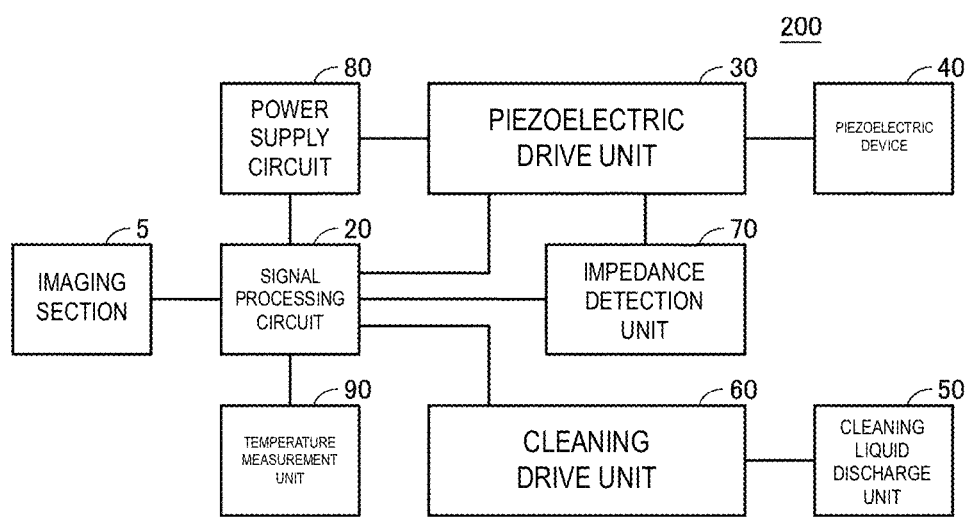
FIG. 10 is a block diagram for explaining control of a cleaning apparatus of an imaging unit according to Preferred Embodiment 2 of the present invention.

FIG. 10 is a block diagram for explaining control of a cleaning apparatus of an imaging unit 200 according to Preferred Embodiment 2. The imaging unit 200 includes the imaging section 5, the signal processing circuit 20, the piezoelectric driver 30, the piezoelectric device 40, the cleaning liquid discharger 50, the cleaning driver 60, the impedance detector 70, the power supply circuit 80, and a temperature detector 90. The imaging unit 200 has the same or substantially the same configuration as that of the imaging unit 100 illustrated in FIG. 3, except that the temperature detector 90 is added, and the same or corresponding elements are denoted by the same reference numerals and detailed description thereof will not be repeated.

The temperature detector 90 can measure a temperature of the imaging unit 200, for example, in a vicinity of the vibrator or the protective cover 2. It is sufficient that the temperature detector 90 can output the measured temperature to the signal processing circuit 20, and, for example, a known temperature sensor or temperature measurement device may be used.

The signal processing circuit 20 uses information on the temperature measured by the temperature detector 90 to control the piezoelectric driver 30 such that the protective cover 2 is vibrated at the resonant frequency. For example, when the temperature is changed from about −40° C. to about 85° C., the resonant frequency of the protective cover 2 decreases as the temperature increases. Thus, the signal processing circuit 20 controls the frequency, at which the protective cover 2 is vibrated in consideration of not only the impedance detected by the impedance detector 70 but also the measurement result of the temperature detector 90. Compared with a case where tracking control is performed, based only on the impedance detected by the impedance detector 70, such that the protective cover 2 is vibrated at the resonant frequency, accuracy of tracking a change in the resonant frequency of the protective cover 2 is improved in the case where the tracking control is performed in consideration of the temperature measured by the temperature detector 90.

As described above, the cleaning apparatus according to Preferred Embodiment 2 may further include the temperature detector 90 that measures a temperature of the piezoelectric device 40 or the protective cover 2, and the signal processing circuit 20 may control a frequency at which the protective cover 2 is vibrated, based on a measurement result of the temperature detector 90. Thus, the signal processing circuit 20 can accurately perform tracking such that the protective cover 2 is vibrated at the resonant frequency.

In the imaging units according to the above-described preferred embodiments, although a configuration of the imaging section 5 is not particularly described in detail, the imaging section 5 may include, for example, a camera, a LiDAR, a Rader, or the like.

The imaging units according to the above-described preferred embodiments have been described to be configured such that one cleaning nozzle 3 is provided in the housing 1 as illustrated in FIG. 1, but the present invention is not limited thereto, and a configuration may be provided in which a plurality of the cleaning nozzles 3 are provided in the housing 1.

The imaging units according to the above-described preferred embodiments have been described to be configured such that, as illustrated in FIG. 2, the vibrator 12 includes the first cylindrical member 13 having the cylindrical or substantially cylindrical shape, the second cylindrical member 14 having the cylindrical or substantially cylindrical shape, and the piezoelectric vibrator 15 having the cylindrical or substantially cylindrical shape, but the present invention is not limited thereto, and another configuration may be provided as long as the protective cover 2 can be vibrated at the resonant frequency in the configuration.

The imaging units according to the above-described Preferred embodiments are applicable not only to an imaging unit provided in a vehicle, but also to an imaging unit for an application in which a light-transmissive body disposed in a field of view of an imaging element needs to be cleaned.

The description has been provided that, in the imaging units according to the above-described preferred embodiments, as information for determining that foreign matter adheres to the surface of the protective cover 2, there is a change over time in an image captured by the imaging section 5, for example, a change over time in a brightness integral value of an image captured by the imaging section 5. However, the present invention is not limited thereto, and for example, as a change over time in an image captured by the imaging section 5, a blur of an edge of the captured image may be evaluated by a frequency spectrum of image processing to determine, based on a change over time in the frequency spectrum, that foreign matter adheres to the surface of the protective cover 2.

Specifically, when raindrops adhere as foreign matter to the surface of the protective cover 2, in an image captured by the imaging section 5, a blur occurs at an edge of the image as compared with a case where no raindrop adheres thereto, and frequency power of a frequency spectrum increases at a lower frequency as compared with an image in a state where no blur occurs. Thus, when the frequency at which the frequency power increases in the frequency spectrum changes to be low, the signal processing circuit 20 can determine that raindrops as foreign matter adhere to the surface of the protective cover 2. By the signal processing circuit 20 determining, in combination with the change over time in the frequency spectrum, that foreign matter adheres to the surface of the protective cover 2, accuracy can be further improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning apparatus, comprising:
    a holder to hold an imaging element;
    a light-transmissive body in a field of view of the imaging element;
    a vibrator to vibrate the light-transmissive body;
    a driver to drive the vibrator;
    a discharger to discharge a cleaner onto a surface of the light-transmissive body;
    a controller to control the driver and the discharger; and
    a detector to detect a value related to an impedance of the vibrator driven by the driver; wherein
    the surface of the light-transmissive body has water repellency;
    the controller is configured or programmed to control the driver such that the light-transmissive body is vibrated at a resonant frequency for a predetermined period after the discharger is caused to discharge the cleaner in order to make the surface of the light-transmissive body pseudo-hydrophilic, and control the driver such that, after the predetermined period, vibration of the light-transmissive body is stopped or the light-transmissive body is vibrated at a frequency other than the resonant frequency in order to return the surface of the light-transmissive body to a state of water repellency; and
    the controller is configured or programmed to perform tracking control such that the light-transmissive body is vibrated at the resonant frequency between a first resonant frequency and a second resonant frequency based on the value related to the impedance detected by the detector.

2. The cleaning apparatus according to claim 1, wherein the controller is configured or programmed to drive a voltage of the driver in the predetermined period.

3. The cleaning apparatus according to claim 1, further comprising:
    a determiner to determine foreign matter adhering to a surface of the light-transmissive body; wherein
    the controller is configured or programmed to cause, when the determiner determines that foreign matter adheres to a surface of the light-transmissive body, the discharger to discharge the cleaner.

4. The cleaning apparatus according to claim 3, wherein the determiner determines, based on at least one information piece of a change over time in a value related to impedance and detected by the detector and a change over time in an image captured by the imaging element, that foreign matter adheres to a surface of the light-transmissive body.

5. The cleaning apparatus according to claim 3, wherein the controller is configured or programmed to change, when a type of foreign matter adhering to a surface of the light-transmissive body is specified, by the determiner, based on an analysis result of an image captured by the imaging element, the predetermined period, for which the light-transmissive body is vibrated at a resonant frequency, according to the type of foreign matter specified.

6. The cleaning apparatus according to claim 1, further comprising:
    a temperature detector to measure a temperature of the vibrator or the light-transmissive body; wherein
    the controller is configured or programmed to control, based on a measurement result of the temperature detector, a frequency at which the light-transmissive body is vibrated.

7. An imaging unit, comprising:
    an imaging element; and
    the cleaning apparatus according to claim 1.

8. A cleaning method for cleaning a surface of a light-transmissive body having water repellency by a cleaning apparatus that includes a holder to hold an imaging element, the light-transmissive body in a field of view of the imaging element, a vibrator to vibrate the light-transmissive body, a driver to drive the vibrator, a discharger to discharge a cleaner onto the surface of the light-transmissive body, and a controller to control the driver and the discharger, the cleaning method comprising:
    causing the discharger to discharge the cleaner;
    controlling the driver such that the light-transmissive body is vibrated at a resonant frequency for a predetermined period after the cleaner is caused to be discharged in order to make the surface of the light-transmissive body pseudo-hydrophilic; and
    controlling the driver such that, after the predetermined period, vibration of the light-transmissive body is stopped or the light-transmissive body is vibrated at a frequency other than the resonant frequency in order to return the surface of the light-transmissive body to a state of water repellency; wherein
    the cleaning apparatus includes a detector to detect a value related to an impedance of the vibrator driven by the driver; and
    the controller performs tracking control such that the light-transmissive body is vibrated at the resonant frequency between a first resonant frequency and a second resonant frequency based on the value related to the impedance detected by the detector.

9. The imaging unit according to claim 7, wherein the controller is configured or programmed to drive a voltage of the driver in the predetermined period.

10. The imaging unit according to claim 7, further comprising:
    a determiner to determine foreign matter adhering to a surface of the light-transmissive body; wherein
    the controller is configured or programmed to cause, when the determiner determines that foreign matter adheres to a surface of the light-transmissive body, the discharger to discharge the cleaner.

11. The imaging unit according to claim 10, wherein the determiner determines, based on at least one information piece of a change over time in a value related to impedance and detected by the detector and a change over time in an image captured by the imaging element, that foreign matter adheres to a surface of the light-transmissive body.

12. The imaging unit according to claim 10, wherein the controller is configured or programmed to change, when a type of foreign matter adhering to a surface of the light-transmissive body is specified, by the determiner, based on an analysis result of an image captured by the imaging element, the predetermined period, for which the light-transmissive body is vibrated at a resonant frequency, according to the type of foreign matter specified.

13. The imaging unit according to claim 7, further comprising:
   a temperature detector to measure a temperature of the vibrator or the light-transmissive body; wherein
   the controller is configured or programmed to control, based on a measurement result of the temperature detector, a frequency at which the light-transmissive body is vibrated.

14. The cleaning method according to claim 8, wherein in the controlling the driver, the controller drives a voltage of the driver in the predetermined period.

15. The cleaning method according to claim 8, wherein
   the cleaning apparatus includes a determiner to determine foreign matter adhering to a surface of the light-transmissive body; and
   the controller causes, when the determiner determines that foreign matter adheres to a surface of the light-transmissive body, the discharger to discharge the cleaner.

16. The cleaning method according to claim 15, wherein the determiner determines, based on at least one information piece of a change over time in a value related to impedance and detected by the detector and a change over time in an image captured by the imaging element, that foreign matter adheres to a surface of the light-transmissive body.

17. The cleaning method according to claim 15, wherein the controller changes, when a type of foreign matter adhering to a surface of the light-transmissive body is specified, by the determiner, based on an analysis result of an image captured by the imaging element, the predetermined period, for which the light-transmissive body is vibrated at a resonant frequency, according to the type of foreign matter specified.

* * * * *